United States Patent
Cross et al.

(10) Patent No.: US 7,382,883 B2
(45) Date of Patent: *Jun. 3, 2008

(54) DERIVING A SYMMETRIC KEY FROM AN ASYMMETRIC KEY FOR FILE ENCRYPTION OR DECRYPTION

(75) Inventors: David B. Cross, Redmond, WA (US); Jianrong Gu, Bellevue, WA (US); Josh D. Benaloh, Redmond, WA (US); Thomas C. Jones, Sammamish, WA (US); Paul J. Leach, Seattle, WA (US); Glenn D. Pittaway, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/611,051

(22) Filed: Dec. 14, 2006

(65) Prior Publication Data

US 2007/0088947 A1     Apr. 19, 2007

Related U.S. Application Data

(63) Continuation of application No. 10/351,683, filed on Jan. 27, 2003, now Pat. No. 7,181,016.

(51) Int. Cl.
    *H04L 9/00* (2006.01)
(52) U.S. Cl. ............... 380/281; 380/284; 380/277; 713/165; 713/172; 705/71; 726/26
(58) Field of Classification Search ............ 380/281, 380/277, 284; 713/165, 172; 705/71; 726/26
    See application file for complete search history.

(56) References Cited

U.S. PATENT DOCUMENTS

| 5,533,123 | A  | * | 7/1996 | Force et al. ............... 713/189 |
| 6,072,876 | A  |   | 6/2000 | Obata et al. ............... 380/286 |
| 6,230,272 | B1 | * | 5/2001 | Lockhart et al. ............... 726/2 |
| 6,249,866 | B1 | * | 6/2001 | Brundrett et al. ........... 713/165 |
| 6,389,535 | B1 |   | 5/2002 | Thomlinson et al. ....... 713/165 |
| 6,393,565 | B1 | * | 5/2002 | Lockhart et al. ............ 713/172 |

(Continued)

FOREIGN PATENT DOCUMENTS

EP        1044436        8/1999

OTHER PUBLICATIONS

*Accessing Files Programmers Guide 900 Series HP 3000 Computer Systems*. Hewlett-Packard Company, Manufacturing Part No. 32650-90885 E0300, Mar. 2000, pp. 1-236.

(Continued)

*Primary Examiner*—Minh Dieu Nguyen
(74) *Attorney, Agent, or Firm*—Merchant & Gould P.C.

(57) ABSTRACT

One aspect relates to a process and associated device that provides a private key of an asymmetric key pair in a key device. A symmetric master key is derived from the private key of the asymmetric key pair. The symmetric master key is stored in a computer memory location. The symmetric master key is used to encrypt or decrypt a file encryption key. The file encryption key can encrypt or decrypt files. In another aspect, the user can still access the files even if a user deactivates the key device by encrypting or decrypting the file encryption key directly from the symmetric master key.

19 Claims, 10 Drawing Sheets

U.S. PATENT DOCUMENTS

| | | | | |
|---|---|---|---|---|
| 6,792,536 | B1* | 9/2004 | Teppler | 713/178 |
| 6,842,523 | B1 | 1/2005 | Niwa et al. | |
| 2002/0071566 | A1 | 6/2002 | Kum | 380/281 |
| 2002/0076051 | A1* | 6/2002 | Nii | 380/232 |
| 2003/0120601 | A1* | 6/2003 | Ouye et al. | 705/51 |
| 2004/0117625 | A1 | 6/2004 | Grwarock | 713/168 |

OTHER PUBLICATIONS

*Big Crocodile Password Manager* [online]. [Retrieved Aug. 10, 2007], pp. 1. Retrieved from internet: <URL: http://www.sowsoft.com/bigcroc.htm>.

Blaze, Matt. *A Cryptographic File System for Unix*. Proceedings of the 1st ACM Conference on Computer and Communications Security; Nov. 1993, pp. 9-16.

Blaze, Matt. *Key Management in an Encrypting File System*. Proceedings of the 1994 USENIX Summer Technical Conference, Jun. 1994, pp. 27-35.

Brostoff, Alexander. *Improving Password System Effectiveness*. PhD Thesis, University College London, Sep. 2004, pp. 1-313.

Cooper, Mendel. *Advanced Bash-Scripting Guide: An In-Depth Exploration of the Art of Shell Scripting*. Dec. 15, 2006, pp. 1-695.

*Getting Started as an MPE/iX Programmer Programmers's Guide*. Hewlett-Packard Corporation, HP Part No. 32650-90008, Second Edition, 1992, pp. 1-192.

*GnuPG—Release Notes* [online]. [Retrieved on Nov. 7, 2007], Dec. 20, 1997, pp. 1-19. Retrieved from internet: < URL: http://www.gnupg.org/(en)/download/release_notes.html>.

*Java 2 SDK, Standard Edition 1.2.2_17/_017 (J2SE)* [online]. Sun Microsystems, [retrieved on Aug. 2, 2007]. Retrieved from internet: <URL: http://java.sun.com>.

*JDK 5.0 Documentation* [online]. Sun Java, [retrieved on Jul. 5, 2007], pp. 1-5. Retrieved from internet: <URL: http://java.sun.com/j2se/1.5.0/docs/index.html>.

*MySecurity Vault PRO Password Backup* [online]. White Canyon Software, [retrieved on Aug. 10, 2007], pp. 1-2. Retrieved from internet: <URL: http://www.whitecanyon.com/password-backup.php>.

*NSA Security Enhanced Linux* [online]. [Retrieved on Nov. 29, 207]. Retrieved from internet: <URL: http//www.nsa.gov/selinux>.

*NSA Security-Enhanced Linux: What's New with SELinux* [online]. [Retrieved on Aug. 10, 2007], pp. 1-16. Retrieved from internet: <URL: http://www.nsa.gov/selinux/news.cfm>.

*SELinux Mailing List: By Thread* [online]. NSA, Security-Enhanced Linux, [retrieved on Jul. 5, 2007], pp. 1-22. Retrieved from internet: <URL: http://www.nsa.gov/selinux/list-archive/0101/thread_body8.cfm>.

Tanenbaum, Andrew S. *Modern Operating Systems*, pp. 195-201. Prentice Hall, Inc., ISBN 0-13-588187-0, 1992.

Tanenbaum, Andrew S. *Operating System Design and Implementation*. Prentice-Hall International Editions, ISBN 0-13-637331-3, 1987.

*The GNU Privacy Guard* [online]. GnuPG.org, [retrieved on Aug. 10, 2007]. Retrieved from Internet: <URL: http://www.gnupg.org/>.

VanBuer, Darrel. *Re: Stanford Breakin* [online]. Risks-3.62 Digest, E-mail; Sep. 24, 1986; 09:35:37 PDT; [retrieved on Aug. 10, 2007]. Retrieved from internet: <URL: http://catless.ncl.ac.uk/Risks/3.67.html>.

* cited by examiner

US 7,382,883 B2

DERIVING A SYMMETRIC KEY FROM AN ASYMMETRIC KEY FOR FILE ENCRYPTION OR DECRYPTION

CROSS-REFERENCE TO RELATED APPLICATIONS

This application is a continuation of prior, U.S. Patent Application for "Deriving a Symmetric Key From An Asymmetric Key For File Encryption or Decryption," filed on Jan. 27, 2003 and assigned Ser. No. 10/351,683, now U.S. Pat. No. 7,181,016, the complete disclosure of which is hereby incorporated by reference in its entirety.

TECHNICAL FIELD

This disclosure relates to encryption or decryption, and more particularly to keys used for encrypting or decrypting files.

BACKGROUND

Current file encryption systems provide a technique for a general-purpose computer to encrypt or decrypt computer-base files. Current encryption and decryption techniques typically rely on lengthy strings (e.g., 1024 bits, 2048 bits, 4096 bits, or more) to provide for secure encryption or decryption of files. Computer performance suffers due to the amount of data in the messages as well as the size of the encryption keys themselves.

Asymmetric file encryption systems use a different key to encrypt a file from the key used to decrypt the encrypted file. Many current file encryption systems rely on asymmetric encryption, such as those that rely on public key/private key pairs. An example of an encryption algorithm that utilizes public key/private key pairs is the RSA (Rivest, Shamir, and Adleman) algorithm. Asymmetric keys by their nature, are very expensive in terms of CPU time largely since asymmetric keys are typically quite lengthy.

Symmetric file systems use an identical key to encrypt a file as the key used to decrypt the encrypted file. Certain file encryption systems utilize a cryptographic process or random number generator to derive a FEK is used to encrypt the file. Symmetric cryptography functions up to five orders of magnitude faster than asymmetric cryptography on files. Even with a very fast key device or software that encrypts/decrypts using the asymmetric key, any such file encryption system still has to overcome the fact that asymmetric keys generally operate at orders of magnitude slower than symmetric keys. When using the file encryption key, each time a file is being authenticated, the file encryption key has to be decrypted by the asymmetric key which is time consuming.

Key devices such as smartcards have been used for user authentication within the operating system. Smartcards typically rely on asymmetric keys and have very limited data throughput, both of which detract from their use in encrypting or decrypting files. As such, the time required for the smart cards to encrypt or decrypt files within a general-purpose computer is relatively long.

SUMMARY

This disclosure relates to a method, an associated apparatus, an electronically-accessible media, and a computer readable media for providing a private key of an asymmetric key pair in a key device. The private key of the asymmetric key pair is used to derive a symmetric master key. The derived symmetric master key is used to encrypt a file encryption key (FEK) (which is another symmetric key). The FEK is then used to encrypt files. In another aspect of this disclosure, the user can still access the files even if a user deactivates the key device by using the symmetric master key to encrypt the FEK. Certain aspects of this disclosure provide a technique by which files can be encrypted more efficiently and effectively in terms of processor usage.

BRIEF DESCRIPTION OF THE DRAWINGS

Throughout the drawings, the same numbers reference like features and components.

DETAILED DESCRIPTION

One aspect of this disclosure details the encryption or decryption of files using an encrypting file system that can be located on a general-purpose computer system, or another such computer. One aspect of this disclosure is to provide a file encryption system (i.e., an encrypting file system) for general-purpose computers. One embodiment of such an encrypting file system is described in U.S. Pat. No. 6,249,866, which issued on Jun. 19, 2001 to Brundrett et al. with the title "Encrypting File System and Method" (assigned to the assignee of the present disclosure), and is incorporated by reference herein in its entirety.

An algorithm described in this disclosure describes a general-purpose computer deriving the symmetric master key from an asymmetric key for the purpose of file encryption. Certain aspects of the present disclosure describe how to encrypt files using the symmetric master key that is stored in a computer memory. Every user's symmetric master key is unique. Only the user himself can derive their own symmetric master key. No other individual can derive another person's master key as no one can access another person's private key. The symmetric master key is derived at least once from an asymmetric key that is stored in the key device. The symmetric master key can be used to encrypt a file encrypting key (FEK). The FEK is generated randomly. The FEK can encrypt the files.

The FEK and symmetric master key may be utilized in an "EFS", which is an acronym for Encrypting File System (EFS). The acronym "EFS" as used within this disclosure is intended to apply to any encrypting file system or file encryption system, one example of which is the Encrypting File System that is used in many Microsoft Windows®

Operating Systems such as Windows XP®. Such Microsoft Windows Operating Systems are produced and distributed by Microsoft Corporation.

Figure 1:
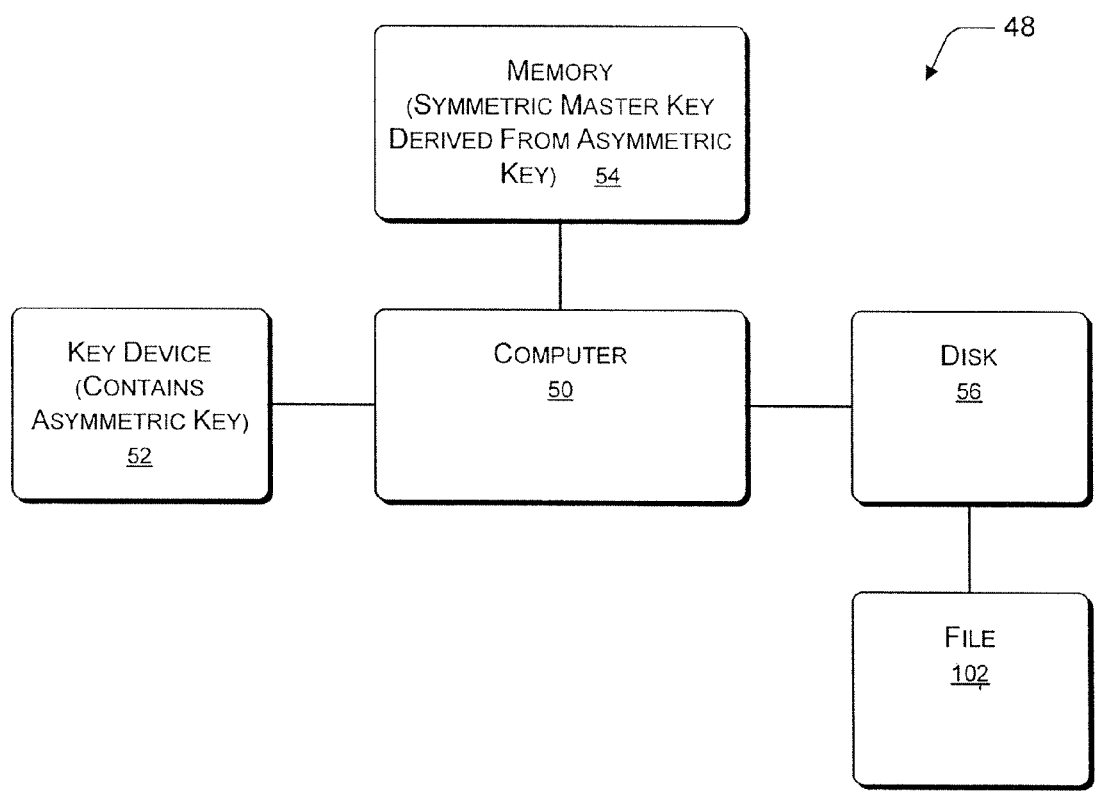
FIG. 1 illustrates a block diagram of one embodiment of an encrypting file system (EF)

The encrypting file system, one embodiment is shown in FIG. 1, is provided with the reference character 48. One embodiment of the EFS detailed in this disclosure uses an asymmetric key pair. The asymmetric key pair can be stored in the key device. The symmetric master key is then derived from the private key of the asymmetric key pair. Alternately, the symmetric master key could be derived using both keys of the asymmetric key pair.

The EFS 48 derives a symmetric key (referred to herein as the symmetric master key) from the private key of the asymmetric key pair. Each symmetric master key is associated with a particular user. The symmetric master key is then stored in a computer memory location (not the key device 52 as is the asymmetric key) that can be accessed for encryption purposes. The computer memories are typically able to be accessed considerably quicker than the key devices 52. Therefore, the present disclosure provides a mechanism to increase the speed of file encryption and decryption. Once the symmetric master key is stored in the memory, in one embodiment, the symmetric master keys are encrypted using the session keys for the general purpose computer or operating system on a per-boot basis.

The EFS follows the security practice that the user has to provide to the EFS "something the user has and something the user knows", which is also referred to as two factor authentication. The "something the user has" may be the key device such as a smartcard, or any other device used for authentication. The something the user knows may be a PIN, password, alphanumeric string, or similar aspect relating to signing on.

Figure 7:
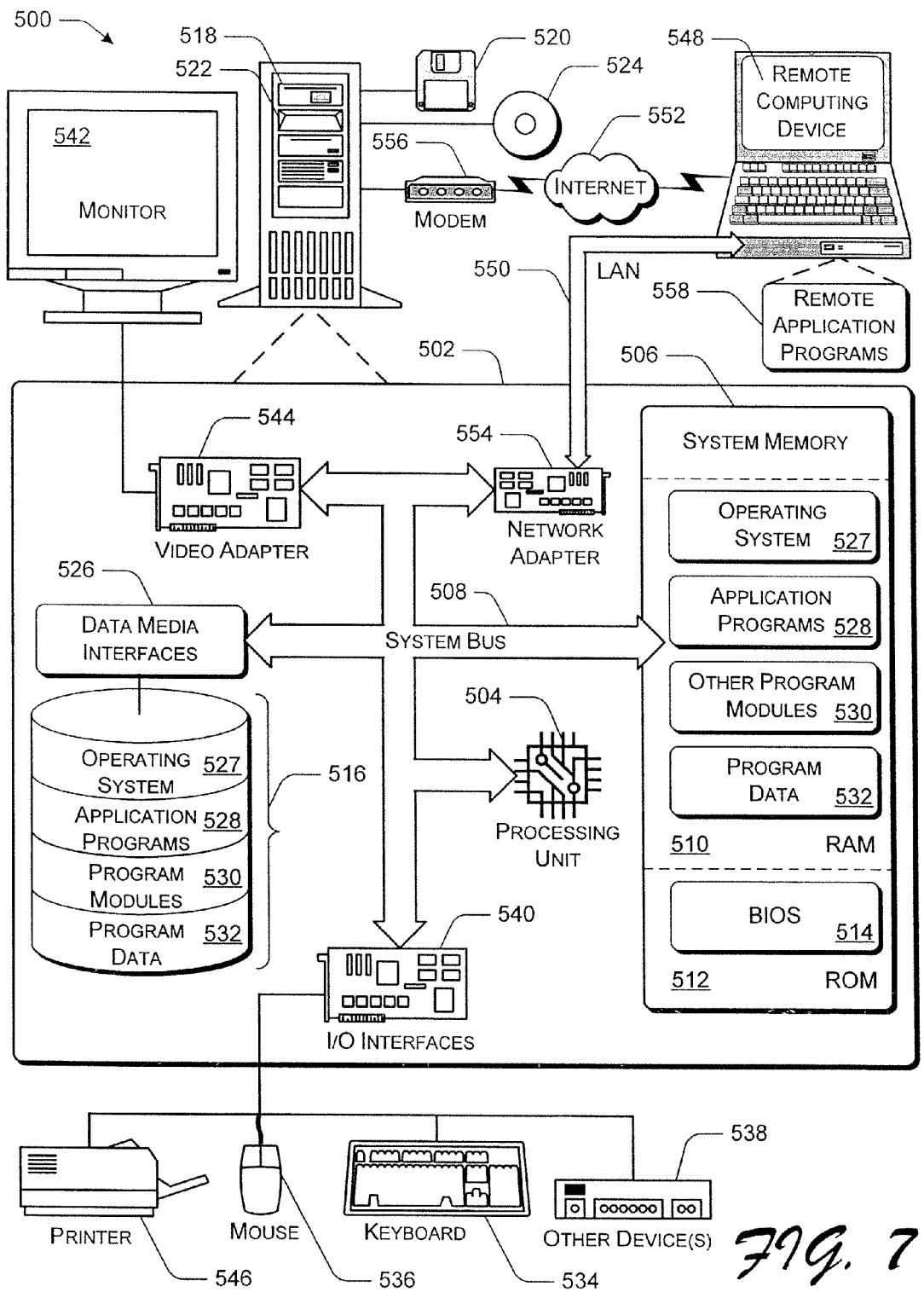
FIG. 7 illustrates an exemplary computing operating environment that is capable of implementing (wholly or partially) at least one EFS method, and/or process as described herein.

One generalized embodiment of the EFS 48 as shown in FIG. 1 includes a computer 50 (e.g., a general-purpose computer), a key device 52, a computer memory 54, a disk drive 56, and a file system 102. The structure and operation of each of the devices 50, 52, 54, 56, and 102 is detailed in this disclosure. The EFS can also utilize more complex computer systems, such as the computer 502 and the remote computer 548 arranged in a network configuration as shown in FIG. 7 and described in detail. The file system 102 as shown in FIG. 1, in one embodiment, is software that can run on hardware such as the disk drive 56. It is envisioned that storing the data associated with the file system 102 on any other memory device within the computer memory 54 is within the intended scope of the present disclosure.

The EFS 48, in general, can operate to derive the symmetric master key from the private key of the asymmetric key pair, and store the symmetric master key in the computer memory 54. One embodiment of an algorithm that can be used to derive such a symmetric master key is illustrated in, and described with reference to, FIGS. 2a, 2b, and 2c. To accomplish this derivation of the symmetric master key, the key device 52 acts to store an asymmetric key pair in a manner such that the private key of the asymmetric key pair can be accessed by the computer 50. The computer memory 54 then stores the symmetric master key in a manner such that the computer can repeatedly, and rapidly, accesses the symmetric master key from the computer memory 54.

The key device 52 may be, in different embodiments, a smartcard, a hardware security module, a token, a hard disk, or another such device that can be configured to contain the private key of the asymmetric key pair. The key device 52 can be considered as a general-purpose device that stores the private key of the asymmetric key pair. As such, the key device may be structured as a peripheral device to the computer 50. Alternatively, the key device 52 can be integrated within the computer itself, such as part of a processor chip or other chip, or as a chip containing only the private key of the asymmetric key pair or the asymmetric key pair, such as an application specific integrated circuit (ASIC), that is actually glued or otherwise secured onto a motherboard of the computer 50. As such, in some instances the chip can be actually contained within the general-purpose computer, and on the motherboard. If there is no hardware device storing the private key of the asymmetric key pair, it could also be stored in software, such as stored on a hard disk. As such, the key device should be considered very generic.

Certain aspects of the present disclosure are directed at usage of a so-called symmetric master key algorithm that is used to derive the symmetric master key from the private key of the asymmetric key pair. The asymmetric key pair resides on the key device 52. A file encryption key (FEK), which is used to open the files, is protected by, and encrypted using, the symmetric master key. The FEK is generated randomly. The private key of the asymmetric key pair is not held in the computer memory 54 for security reasons, and instead are held in the key device 52. Using the symmetric master key to encrypt the FEK, which is thereupon used to encrypt the files offers substantial performance improvement over a system in which the asymmetric key pair is used to directly encrypt the FEK. Using the symmetric master key that is stored in the computer memory 54 therefore provides the same level of security as using the private key of the asymmetric key pair that is contained in the key device 52, while also significantly increasing performance such as computer throughput.

The EFS can use a variety of different embodiments and algorithms to derive the symmetric master key from the private key of the asymmetric key pair. The RSA cryptographic algorithm is a well-known and accepted cryptographic algorithm. RSA is used primarily for public key cryptography. Other algorithms like DES (Data Encryption Standard), Triple DES, AES (Advanced Encryption Standard), RC4, etc. are used to encrypt and decrypt data files using the FEK that is encrypted using the symmetric master key.

This disclosure describes certain embodiments of the EFS that use the RSA algorithm. It is within the intended scope of the invention that RSA, or any other cryptographic algorithm, can be used while remaining within the scope of the present disclosure. In a file system such as the Windows NT® File System (NTFS) that is included in such Windows operating systems as Windows NT® and Windows XP® for the kernel mode, the symmetric master key is derived using the user's RSA private key.

The RSA algorithm is based on taking two large prime numbers, p and q, and computing the modulus, n, as the product of the prime numbers where n=pq. A number, e, is chosen that is less than the modulus n and relatively prime to (p−1)(q−1), wherein e and the product (p−1)(q−1) have no common factors except 1. Another number, d, is selected such that (ed−1) is divisible by (p−1)(q−1). The values e and d are called the public and private exponents, respectively. The public key is the pair (n, e); the private key is (n, d). The factors p and q may be destroyed or kept with the private key as desired by the user.

Overall, the bulk encryption, in which the files are encrypted, uses the FEK. The FEK is encrypted from the symmetric master key. Instead of using the asymmetric key to directly encrypt and decrypt the FEK, this disclosure describes certain embodiments of the EFS that use the symmetric master key (that is derived from the private key of the asymmetric key pair) to encrypt the FEK. This symmetric master key is derived from the private key of the asymmetric key pair, and can be reused without requiring continual access to the original asymmetric key pair. DH (Diffie-Hellman) and ECC (elliptic curve cryptography) are examples of other known encryption algorithms that can be used instead of the RSA algorithm in certain embodiments. Other such cryptographic algorithms that operate to encrypt and/or decrypt files using the FEK that is encrypted or decrypted from the symmetric master key (similar to as described relative to the RSA algorithm) are within the intended scope of the present disclosure.

There are potential benefits of those embodiments of the EFS 48 that rely on the symmetric master key being stored in the computer memory 54. For example, the file can be encrypted or decrypted from the symmetric master key in the computer memory 54 where the user had previously logged onto the system using a private key of the asymmetric key pair that is not in the computer memory 54. In typical prior systems, encryption could not be performed unless the key device was connected to the EFS system (e.g., a smartcard was inserted in the EFS 48). If the key device 52 was disconnected, the process stopped right away. With the EFS as shown in FIG. 1 (using the symmetric master key stored in the memory 54) the encrypted process will continue within the general-purpose computer even though the key device is disconnected (e.g., the smartcard is removed).

The EFS 48 thereby provides a mechanism to continue the process even if the key device is disconnected. A general-purpose computer can continue to perform its task using the symmetric master key contained in the memory 54 because the key device 52 initially derived the symmetric master key from the asymmetric key.

The symmetric master key can be held in the computer memory 54 and a process can continue (e.g., several hours later) even if the user signs off. The user can later access the process by signing on again, provided that the process was not terminated. As such, the user is accessing the EFS using a so-called "single sign-on" process.

If the symmetric master key single sign-on process is enabled, in one embodiment, the EFS 48 (i.e., the local security authority) will attempt to store the symmetric master key in the computer memory 54 for the user before, or after, any encrypted or decrypted files are accessed. In general, users dislike having their applications terminate or crash at any time, including when the key device is deactivated. Such termination would occur with many prior systems if the key device is deactivated. The EFS is configured to allow a process initiated on the computer 50 shown in FIG. 1 to continue even after the key device is deactivated. As such, the EFS session is closed only following such process termination as the logoff or workstation lock.

Using a single sign-on process, the user can log onto the system and start a process that derives the symmetric master key, then lock the system and walk away. In this manner, the symmetric master key has been derived, and the system can continue to use the symmetric master key to encrypt the FEK, the latter of which is thereupon used to encrypt files. The user can thereupon return to the process (within a period prescribed by the system), and return to the process as if the user had not locked the system.

Conversely, the user may not need to access the system for some period of time while a process commenced by the user continues. This could actually occur because of the manner in which the symmetric master key is derived and stored, which allows the EFS 48 to continue interfacing with the system while gaining authorization from the symmetric master key. Such a file encryption process represents a performance improvement over encrypting files using the private key of the asymmetric key pair contained in the key device. One value of the present system (in which the symmetric master key is used to encrypt the FEK, and thereupon the FEK encrypts the files) is that the performance is improved by orders of magnitude. Therefore, the ability of the EFS to perform file encryption using the symmetric master key is improved.

In the EFS system using the symmetric master key, the user has access to the private key of the asymmetric key pair that allows derivation of the symmetric master key. With multiple users, the EFS functions by a first user obtaining a private key of the asymmetric key pair that is used to derive the symmetric master key. If the first user succeeds, then the symmetric master key can be used to encrypt the FEK, which there upon can encrypt the files for the first user, Another user can access the private key of the asymmetric key pair to derive that user's symmetric master key, etc.

By using the symmetric master key, the user has access to the private key of the asymmetric key pair that allows decoding of the [FEK]. The [FEK] decrypts the file in the file encryption system so that the application has access to the file.

If a first user wants to let a second user access a file, the first user gets the FEK and then encrypts the FEK with second user's public key (or second user's master key indirectly with the help of the system). If the second user's public key is used, it will be updated with the second user's master key when the file is opened later by the second user. At the time the file is opened by the second user, that user's master key can be derived. With multiple users, the EFS 48 functions by a first user obtaining a private key of the asymmetric key pair that is used to generate or derive the symmetric master key. If the first user succeeds, then the symmetric master key can be used to encrypt the FEK, which there upon can encrypt the files. The first user can thereupon release the asymmetric key, and another private key of the asymmetric key pair since the symmetric master key can be used to encrypt the FEK. Another user can then get access to the private key of the asymmetric key pair to derive their symmetric master key, etc.

If the user has a large key (e.g., a 2048-bit key, a 4096-bit key, or larger such as is common with asymmetric key pairs), the computer system is likely to be relatively slow. If multiple users are using the EFS 48, a lot of operations and processing can be performed that slows down the overall processing speed.

In one embodiment of the disclosure, the symmetric master key can be derived at logon time even if the user is not performing any file operations. The user does not even have to be aware that the general-purpose computer that is running the EFS 48 is actually accessing the key device following logon.

There is another potential benefit of using the EFS 48 with a symmetric master key in the computer memory 54. That benefit is that a user may desire to encrypt or decrypt the files using the FEK, which in turn is has been encrypted using the symmetric master key to circumvent the performance loss that otherwise occurs each time a file is encrypted or decrypted by the key device.

Yet another potential benefit of certain embodiments of the EFS 48 in which a symmetric master key is located in the computer memory 54 is that the user also gains some portability because the EFS 48 can be accessed by remote users. The EFS 48 as shown in FIG. 1 can therefore be applied to networked systems as well as stand-alone computers. As such, the computer memory 54 that contains the symmetric master key is envisioned as being any memory location (i.e., Random Access Memory or Read-Only Memory) within any computer in network communication with the computer 502 (illustrated by the remote computing device 548 described relative to FIG. 7). The symmetric master key can be use to encrypt the FEK, which is thereupon used to encrypt the files at any location across the network using the remote computer device 548. As such, the FEK is generated randomly. The use of the key device 52 to encrypt a file remotely is enabled using client side encryption. As such, it is envisioned that certain embodiments of the EFS 48 enhance the roaming capabilities of the users of the computer 50 described relative to FIG. 1, or alternatively the computer 502 described relative to FIG. 7.

When files are encrypted or decrypted and placed on file servers, web servers, etc, for the purposes of availability, redundancy, backup, it is mandatory that the encryption key(s) be available on client systems that access the files on the remote servers. The files which are encrypted or decrypted end-to-end from the FEK, when downloaded from remote servers and accessed by client systems, will require the decryption process on the client systems. The symmetric master key can be derived or retrieved from the computer memory on any client system in which the key device is made available. Once the symmetric master key is derived or made available, multiple remote servers and encrypted or decrypted files may be downloaded without additional processing on the client system to discover the decryption key. There are several reasons why encrypting files from the FEK, which in turn is encrypted using the symmetric master key that is stored in the computer memory 54, provides for more rapid encryption compared to a system of encrypting files from the FEK using an asymmetric key pair stored in the key device. By its nature, symmetric encryption is many orders of magnitude (up to five orders of magnitude) quicker than asymmetric encryption. Also, the data throughput to and from the locations in the computer memory 54 (where the symmetric master key is stored) is considerably higher than the data throughput to and from the key device 52 (where the private key of the asymmetric key pair is stored and which is often a peripheral device). Additionally, the computer memory 54 typically includes a quicker and more powerful processor than the key device 52.

To illustrate the processing benefits of the present system, assume that an asymmetric key is relatively large (containing 4K or even 16K bits). When using large public and private keys, the public key operation is computationally very expensive. The smartcard is therefore an example of a very suitable implementation of the EFS as described in this disclosure. However, the EFS can also use any high throughput key device 52 such as a hard drive or computer memory. While the key device 52 is commonly implemented as a smartcard that stores the private key of the asymmetric key pair, it is also possible to implement the key device as a symmetric key device.

Because the symmetric master key is derived from the private key of the asymmetric key pair, the symmetric master key can be held in the computer memory 54. After a user has opened a first file, the symmetric master key has been derived. The symmetric master key can thereupon be used to access further files. The EFS process therefore does not have to access the key device 52 multiple times to repeatedly encrypt and/or decrypt one or more files.

If a user opens additional files, there is therefore no need to re-access the key device repeatedly in order to encrypt and/or decrypt the multiple files. Instead, users can encrypt/decrypt the files quickly and repeatedly using the symmetric master key that is stored in the computer memory 54. The symmetric master key allows quick operation partially because it is a symmetric key that can efficiently encrypt or decrypt the FEK (also a symmetric key).

This disclosure describes the derivation and utilization of certain embodiments of symmetric master keys in the EFS 48. One embodiment of the EFS that can derive a symmetric master key from the private key of the asymmetric key pair is integrated within a digital rights management (DRM) system as described herein. It is envisioned that the EFS can derive the symmetric master keys within the DRM system, or alternatively in some other configuration that does not include the DRM system. "NTFS" is an acronym for the New Technology File System of a Microsoft® Windows® operating system such as Windows NT® and Windows XP®. In one embodiment of the NTFS for kernel mode, the EFS derives the random symmetric master key using the user's RSA private key.

A user has access to the private key of the asymmetric key pair that allows derivation of the symmetric master key, and thereupon encryption or decryption of the FEK. Data in a file can be encrypted/decrypted using the FEK in the EFS 48. If the private key of the asymmetric key pair is large, such as with a 2048-bit key or 4096-bit key (or when multiple users are concurrently using the EFS) a lot of operations and processing are necessary. This large amount of processing slows down the processing speed.

This disclosure further details the manner in which the symmetric master key (which in many embodiments is stored in the computer memory 54) is derived from the private key of the asymmetric key pair (which in many embodiments is stored in the key device). Additionally described is the operation of certain embodiments of the symmetric master key, which is used within the EFS 48 to encrypt or decrypt the file encryption key (FEK), which then subsequently encrypts/decrypts the file.

The design of the symmetric master key to be used by the EFS 48 provides for increased performance, reliability, and usability without compromising the requirement for cryptographically protecting the files as set forth in the key device 52. The use of the symmetric master key protects the FEK of an individual file. In one aspect, the FEK is unique for each file. In one embodiment, the FEK is a random AES 256-bit symmetric key, which in turn is encrypted or decrypted by such keys as a user's RSA key or an AES symmetric key such as the symmetric master key.

Certain cryptographic services may be provided to application programs via a set of application program interfaces (API). One specific example of a service layer product that could be used in implementing the symmetric master keys is the Cryptographic Service Provider (CSP) developed by Microsoft® Corporation. The CSP performs cryptographic functions and manages cryptographic keys used in the functions. For instance, one or more CSPs are configured to perform encryption, decryption, digital signing, and verification functions using certain types of cryptographic algorithms and keys. The CSPs are implemented as dynamic linked libraries (DLLs) that are loaded on demand by a cryptographic application program interface (CAPI) and called by the application through the CAPI.

In one aspect, the symmetric master key is derived by obtaining a handle to the private key of the asymmetric key pair that is stored on the key device 52. The EFS 48 can obtain the handle. WINLOGON passes the PIN to a Kerberos provider. Kerberos is one embodiment of authentication service established at MIT. The EFS obtains the PIN from the Kerberos provider. There is therefore no need for the EFS to prompt the user for the PIN. Only when the EFS does not have the right PIN from the Kerberos provider will the EFS prompt the user for a PIN (which often involves another key device process, such as inserting the smartcard in the smartcard reader).

Once the symmetric master key is derived, the EFS 48 will use the symmetric master key to encrypt or decrypt the FEK. The FEK can then be used to encrypt or decrypt a file. The symmetric master key can then be stored in the computer memory 54. The symmetric master key can (and should) be protected in encrypted or decrypted form in the computer memory 54 when not being used.

With one single sign-on process scenario, the user signs on during logon. The symmetric master key is generated during the logon process, and this symmetric master key is then used in the EFS 48 to encrypt or decrypt the FEK, which in turn further encrypts or decrypts files. In this single sign-on process scenario, the EFS 48 should have a call back routine to hook the user's interactive logon to obtain the PIN at that time. This can be accomplished using such logon programs as Terminal Server, RunAs, or Normal Logon (each of these products is developed and made commercially available by Microsoft Corporation). The call back routine could be called by the Kerberos provider. One advantage of having the call back called by the Kerberos provider is that during logon the symmetric master key is stored in a symmetric master key cache (in the computer memory). If a user removes the card after logon, the EFS 48 would still work without re-activating the key device (assuming the symmetric master key is still contained within the computer memory).

In another single sign-on process scenario, the user signs on to the general-purpose computer running the EFS 48 using the key device 52 once following logon. The symmetric master key is thereafter stored in the computer memory location and is used to encrypt and/or decrypt the FEK, which is thereupon used to encrypt/decrypt the files. Such a single sign-on process assumes that the correct key and the correct certificate are being used on the key device (e.g., smartcard) that was used during logon. The call back routine to get the Kerberos key context from the key device 52 mirrors the first single sign-on process scenario.

The EFS can be configured to preemptively derive a symmetric master key before a user accesses the file. This is accomplished by creating a symmetric master key cache in which a symmetric master key (that is derived from the private key of the asymmetric key pair) is stored during logon when the key device is activated. The key device can be actuated, for example, by the user inserting the smartcard in the smartcard reader and the user correctly responding to a PIN query.

As such, the EFS 48 provides a reliable and understandable user experience for encrypting and decrypting files with the key device 52. Certain users, such as employers, desire single certificate issuance to employees for purposes of non-repudiation and ease of file management. Companies and groups are able to ensure a high level of security for employee or member data by the use of a single issuance of the key device 52 for authenticating, signing, and encrypting.

Key cache nodes are used in certain embodiments of the EFS as described herein to store the symmetric master key in the computer memory or memory devices. Two types of key cache nodes relating to the key device 52 are the symmetric master key type cache and the Pin\CardState type cache. Once, the symmetric master key type cache is established, it is not required that the key device be activated (e.g., the smartcard be inserted in the reader) for the EFS to encrypt/decrypt files. The symmetric master key type cache, as determined by system parameters, could be valid even after workstation lock, but would be invalid or disabled for a specific user after use logoff. However, the Pin\CardState type cache would be invalid as soon as the card is removed from the reader.

If there is a file that is encrypted or decrypted in a format other than the symmetric master key format, the key device 52 is actuated (e.g., the smartcard is inserted in the smartcard reader) to use the private key of the asymmetric key pair for deriving the symmetric master key. The symmetric master key is thereupon used to encrypt or decrypt the FEK, which in turn is used to encrypt/decrypt files while using the EFS.

In one embodiment, once the logon program (e.g., WinLogon) has validated the user, the local security authority (LSA) is permitted to use the credentials (PIN presented by the user) to encrypt/decrypt files with the user private key without further input from the user. The PIN will be accessible by the LSA and the EFS since the Kerberos authentication protocol also uses these mechanisms. Only the symmetric master key model will be used by the EFS for encrypt, decrypt, and update operations.

In different embodiments, the PIN will, or will not, have to be re-entered after logon to unlock the key device. If the logon is not permitted, or the key device is not available, the EFS 48 will determine that the certificate on the file that is associated with the key device is not available to the reader.

In many embodiments of the EFS, the symmetric master key will not be maintained in the computer memory 54 after some prescribed time limit. An idle timeout cache can be used by the EFS 48 to determine the validity of the symmetric master key. If the idle timeout threshold has been reached, the EFS 48 will flush the symmetric master key from the cache or mark the node in the cache as invalid. As such, after a certain amount of time, the symmetric master key will be flushed and the user is no longer granted access to encrypt/decrypt files on the general-purpose computer.

The time limit after which the symmetric master key is to be flushed can be set based on the particular use of, and secrecy associated with, the program. The idle timeout can be based on either the time the EFS 48 symmetric master key is created or the time that is was last accessed. In one embodiment, for example, the symmetric master key will be flushed some prescribed time after the EFS 48 generates the symmetric master key whether or not it was used to encrypt a file. The symmetric master key will be flushed from the computer memory 54 more frequently for more sensitive computer operations. After the symmetric master key is flushed, the user must utilize the key device once again to gain access to the machine, to refresh or restore the symmetric master key in the computer memory 54.

Figure 2A:
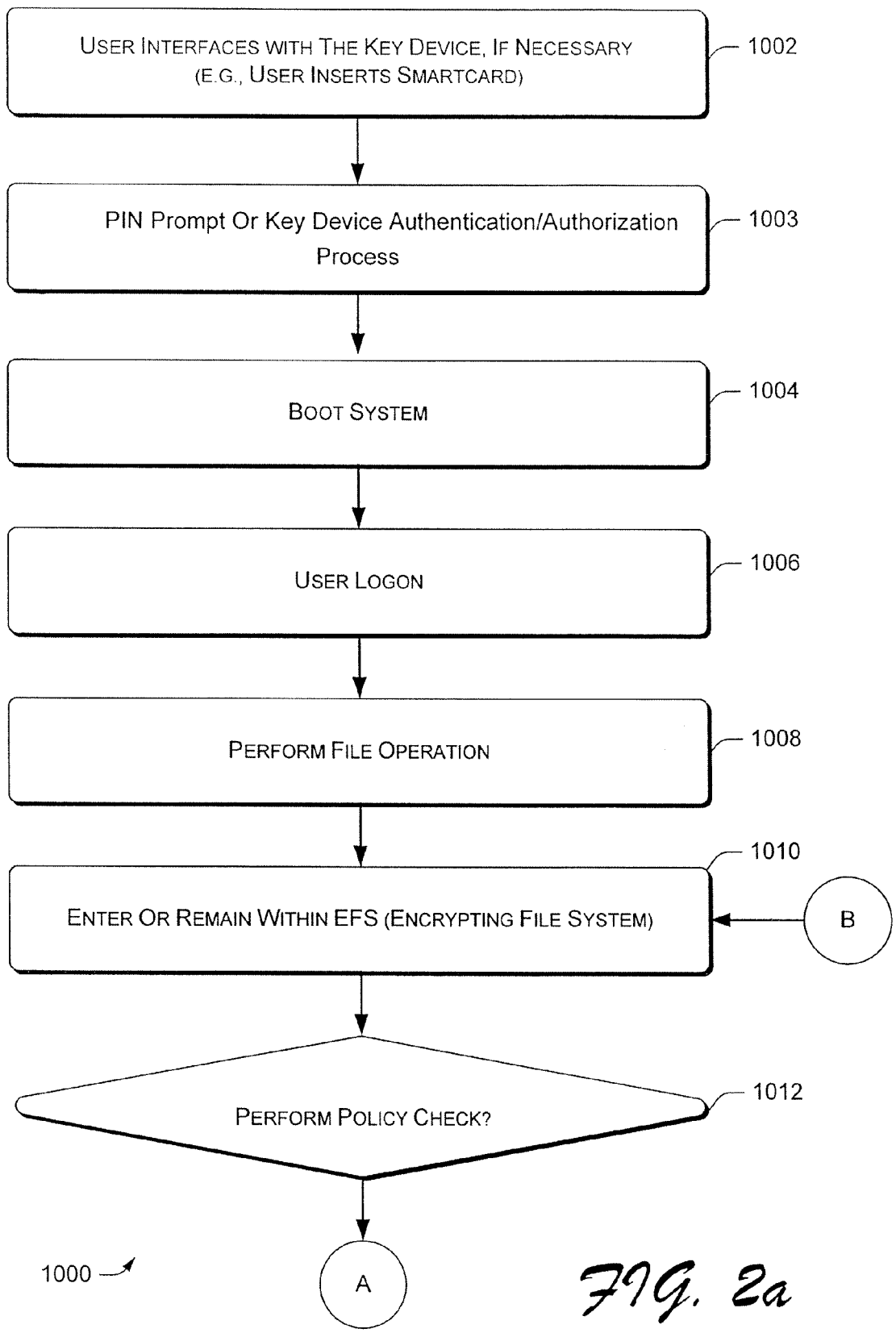
FIGS. 2a, 2b, and 2c illustrate one embodiment of a process that performs a file operation using a derived symmetric master key in the EFS.
Figure 2B:
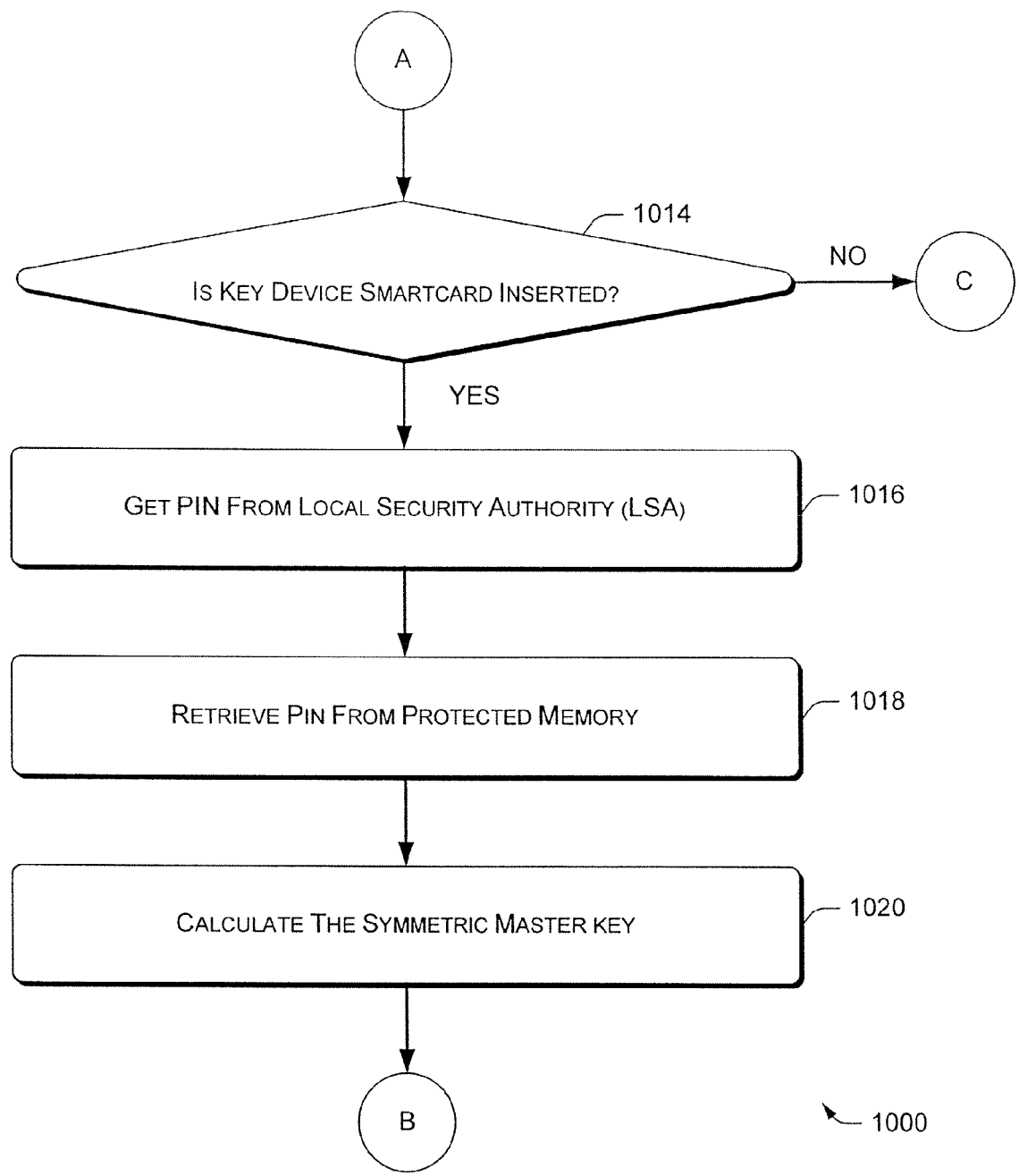
Figure 2C:
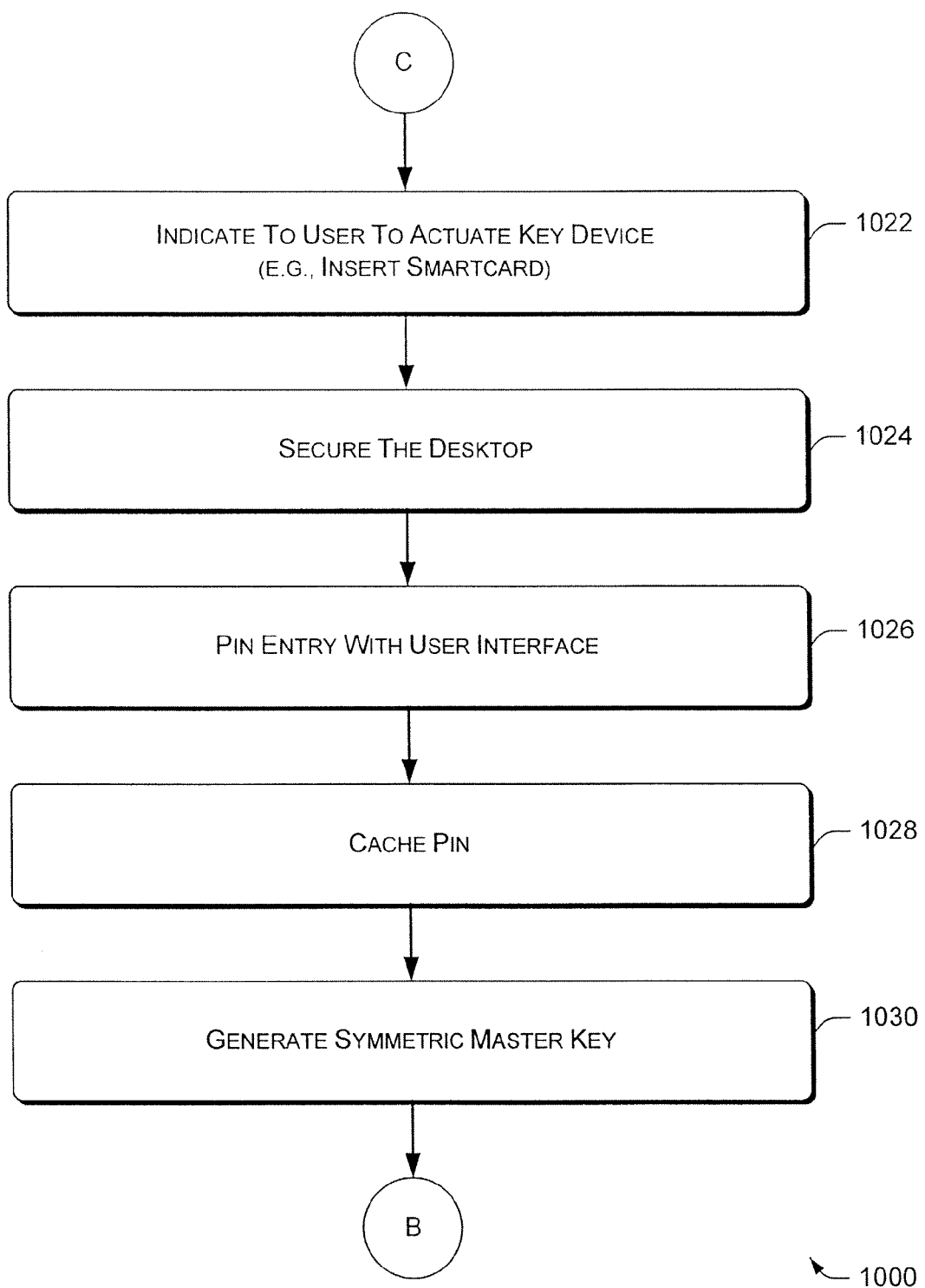

One embodiment of a process 1000 that performs a file operation using a derived symmetric master key in the EFS is illustrated in FIGS. 2*a*, 2*b*, and 2*c*. Process 1000 is the basic work-flow of how one embodiment of the EFS 48 derives the symmetric master key from the private key of the asymmetric (RSA) key pair. In 1002 of process 1000, the user interfaces with the key device (if necessary). To provide one embodiment of this user interface, the user activates the key device such as by inserting the smartcard. The process 1000 continues to 1003 that denotes a PIN prompt or key device authentication/authorization process by which the user types in a correct PIN in response to a PIN query.

The general-purpose computer is booted in 1004 of the process 1000 (in one embodiment using SYSKEY). In 1006 of the process 1000, the user logs onto the EFS 48 (or operating system) using the private key of the asymmetric key pair contained in the key device 52.

At 1008, the EFS 48 performs an operation on a file (such as creating a file, opening a file, or saving a file). The file operation occurs in a file system such as Windows NT file system (NTFS.sys), and then the EFS 48 initiates the master key algorithm used during the remainder of the process 1000. In 1010, the process enters the encrypting file system (EFS). Alternatively, in 1010, the user remains within the EFS if the user has already entered the EFS.

In 1012 of the process 1000, the EFS 48 determines whether the user should be using the symmetric master key or not based on the policy check. In the policy check, if the EFS is configured to allow the user to perform the single sign-on process using a key device, then one embodiment of a single sign-on process as now described provides seamless access to files using the key device 52 that was used for key device logon. The EFS 48 can obtain user credentials from an unlocked smartcard or other key device 52 during logon or workstation unlock. As long as this option is enabled and the key device is actuated (e.g., the smartcard is inserted), the EFS 48 will attempt to get a key handle on the key device 52 by retrieving the PIN from the LSA. The idle timeout will indicate whether a previously actuated key device is deactuated based on the time since the key device has been actuated. If the key device 52 idle timeout is reached, the EFS 48 will see if this option is enabled and will automatically attempt to re-create the symmetric master key cache using the method for a new timeout period (if applicable). If this option is not enabled, the user will be prompted to unlock the key device 52 for use in a given session even if the key device was used to logon to the workstation.

If the user should be using the symmetric master key based on the policy check in 1012, then the EFS determines in 1014 whether the key device is available to the user so that the user can get access to the private key of the asymmetric key pair. If the answer to 1014 is yes, then the process continues to 1016. If the answer to 1014 is no, then the process continues to 1022 as described below. In 1016, the EFS obtains a PIN from a local security authority. In 1018, the PIN is retrieved from the protected computer memory 54. In 1020, the symmetric master key is calculated using the PIN. The symmetric master key is then used to encrypt or decrypt the FEK, which is thereupon used to encrypt or decrypt the desired files.

If the key device is not actuated (e.g., the smartcard is not inserted), then the synchronous master key flow chart 1000 continues to 1022, and the EFS 48 instructs the user using the user interface to actuate the key device, to secure the desktop in 1024, and get the PIN in 1026 that is cached in 1028 to allow application or the EFS 48 to get access to the key device.

Once the EFS 48 has access to the private key of the asymmetric key pair or the asymmetric key pair, this can be used to generate the symmetric master key in 1030. Once the symmetric master key is generated or derived, and the FEK is encrypted or decrypted using the symmetric master key, the file is encrypted or decrypted from the FEK. The intent of the symmetric master key algorithm is to protect the keys and the integrity of the symmetric master key algorithm.

Table 1 describes one embodiment of the software-based implementation of deriving the symmetric master key from the private key of the asymmetric key pair. The commands illustrated in Table 1 (and also Table 2 that is described shortly) are described more fully in the Crypto API, available at Microsoft's web site. Note that the parameters are not provided within Table 1 or Table 2.

TABLE 1

Symmetric Master Key Algorithm(seven components)

1. CryptCreateHash( ) - This component acts to create an empty hash object.
2. CryptGetHashParam( ) - This component acts to retrieve the hash parameters from the hash object. This is used to ensure that sufficient space is reserved for the data to be hashed. In this component, the caller provides the memory for the signature. This component is necessary because the caller does not know the size needed. We make first call passing NULL for memory storage to get the required size. This component can be skipped if a long enough constant is provided to be used as a parameter.
3. CryptSetHashParam( ) - This component acts to set the parameters for a particular hash object.
4. CryptSignHash( ) - This component acts to pass NULL as memory space to get the result length of the signature. This component performs the real signing. In certain embodiments, components 2, 3, and 4 can be combined;
5. Allocate the computer memory for the Signature - This component is self explanatory;
6. CryptSignHash( ) - This component acts to pass in the memory to get the signature that acts to sign the specified hash object based on the length of the signature as determined in component "4";
7. Use the first 256 bits of the Signature as the symmetric master key where one embodiment would be an AES256 KEY - This component acts to create the symmetric master key from the signature. Some prescribed bit sequence of the signature is used to form the symmetric master key. In this example, it is the first 256 bits, but some other order and length of bits from the signature may be used to create the symmetric master key. A secondary function of this signature may also be employed.

In one embodiment of EFS as illustrated in Table 1, the private key of the asymmetric key pair is used to sign a constant to derive the symmetric master key. Depending upon the symmetric master key algorithm to be used for the actual bulk encryption of files, a certain prescribed (usually an initial) sequence of bits are used as appropriate for that algorithm. This string is signed to produce a signature. A prescribed sequence of bits (e.g., the first 256 bits) of the signature, which is the signed data, becomes the symmetric master key.

The functions provided in Tables 1 and 2 relate to a hash function. The hash function provides one embodiment, but non-hash embodiments are also within the scope of the present disclosure. For example, a variation to signing the hash would be to encrypt the constant, and use a certain sequence of selected bits obtained from the encrypted constant as the symmetric master key.

The symmetric master key derived in this manner by using a certain 256 bits of the signature is within the definition of an AES 256-bit symmetric key. AES is a well-known symmetric key algorithm. A known constant is used which allows derivation of the string, and therefore the symmetric master key. Any general-purpose computer (at any location) can derive the same symmetric master key based on the private key of the asymmetric key pair by using the same constant (signature). The sequence of bits that are extracted to form the symmetric master key can be selected based on the algorithm.

Figure 3:
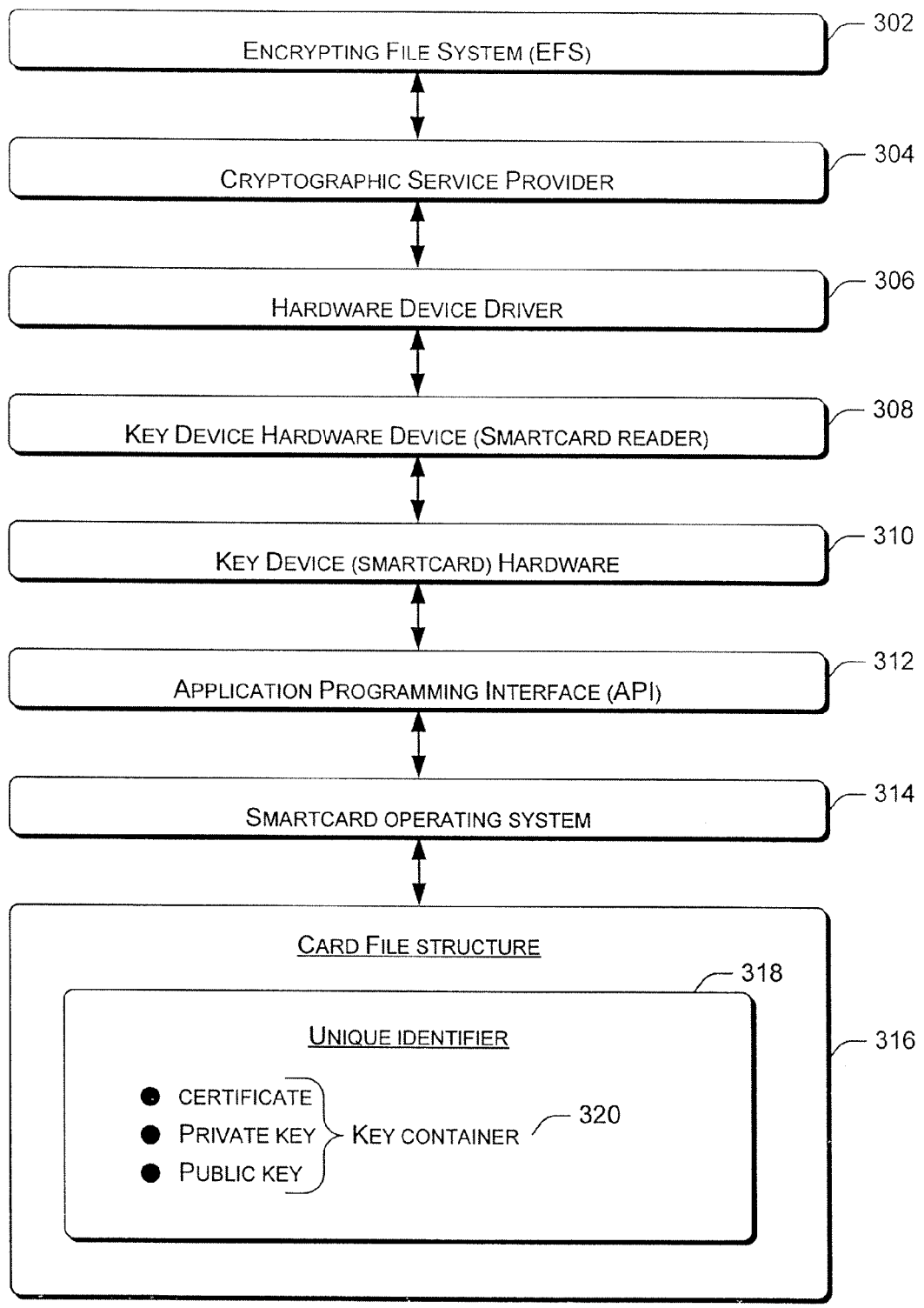
FIG. 3 illustrates a block diagram of one embodiment of a key device (such as a smartcard) and an asymmetric key pair.

FIG. 3 illustrates one embodiment of the architecture of multiple associated components 300 that are associated for encryption purposes. The multiple associated components 300 include the EFS 48, a cryptographic service provider (CSP) 304, a hardware device driver 306, a key device hardware device (such as a smartcard reader) 308, a key device hardware component 310, an application programming interface (API) 312, a key device operating system 314, and a card file structure 316. The device driver includes drivers for such devices as the key device, and allows for the EFS to communicate with the CSP 304. The CSP 304 communicates with the device driver. In one embodiment, the EFS does not talk to the device directly, although it could in another embodiment.

The hardware device driver 306 is the driver that allows the key device (which is a peripheral) to interface with the computer 502. The key device hardware device 308 includes such devices (as a smartcard reader) that interfaces with the key device 310 that in one embodiment is the smartcard. The key device hardware device 308 and the key device 310 together may be considered to act as the key device, and they together are configured to allow the private key of the asymmetric key pair to be accessed to allow generation of the asymmetric master key. A portion of the Application Programming Interface (API) 312 is directed at the key device, and allows the data and software included within the key device hardware 310 to interface with the key device operating system 314. The key device operating system 314 may be configured as an operating system to run on the key device hardware 310 itself that is arranged as a peripheral, or alternatively the key device operating system can run as a portion of the computer 502 as illustrated in FIG. 7. The key device operating system 314 is capable of accessing, storing, and modifying the data stored on the card file structure 316. The private key of the asymmetric key pair is accessible using the unique identifier 318 in the card file structure 316.

The card file structure 316 includes the key pairs of the asymmetric keys that can be referenced by one or more unique identifiers 318. Certain embodiments of unique identifiers are arranged as data stored within a key container 320. The key container includes a certificate, a private key, and a public key. Additionally, one or more public keys and/or private keys (not shown) may be included as a portion of the unique identifier.

Figure 4:
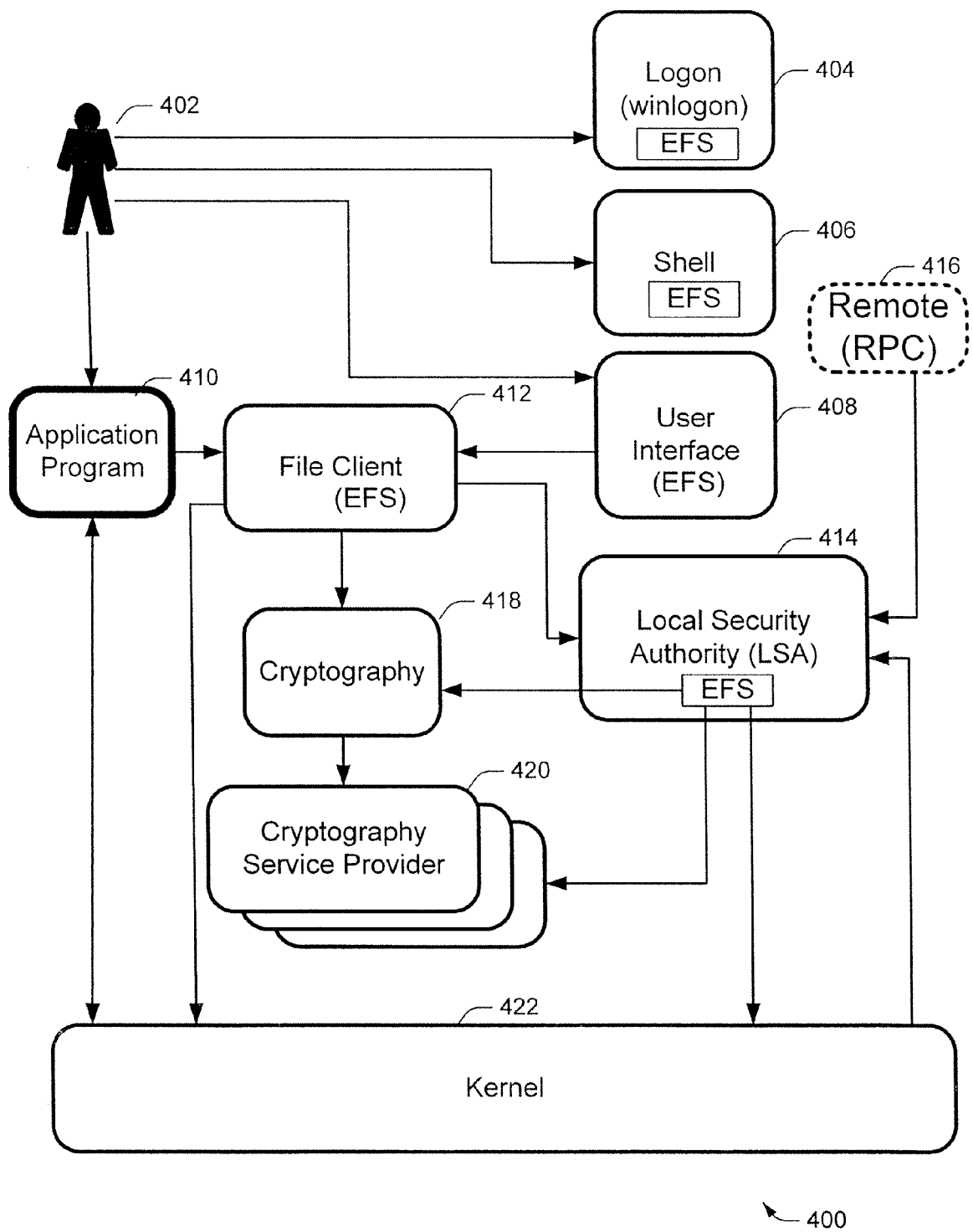
FIG. 4 illustrates a block diagram of one embodiment of the architecture of the EFS.

FIG. 4 illustrates one embodiment of the architecture of the EFS 48 that is configured to use the key device for authentication. The EFS 48 includes a logon portion 404, a shell portion 406, a user interface portion 408 for the EFS, a file client 412, an application program 410, the local security authority 414, remote procedure calls (RPC) 416, the cryptography portion 418, the cryptographic service provider 420, and the kernel 422. The logon portion 404, the shell portion 406, the user interface portion 408, and the application program 410 can receive input from a user 402 to provide normal operating system operations under the influence of the EFS 48.

The local security authority 414 provides some level of security for each computer 502 as shown in FIG. 7. The local security authority 414 relies on the cryptography portion 418 as well as the cryptographic service provider 420. The application program 410, the file client 412, and the local security authority 414 each can interface with the kernel 422. Considering the structure and location of the file client 412, a considerable amount of the performance by the EFS is client-based.

The value output from the signature operation is used as the symmetric master key because it is guaranteed to be unique to the private key of the asymmetric key pair. The probability of deriving identical symmetric master keys from a different private key of the asymmetric key pair is extremely small. Additionally, distinct private keys of the asymmetric key pairs or asymmetric key pairs will almost certainly derive distinct symmetric master keys.

As an additional level of security, to minimize the likelihood of a general application from signing the known constant in a hacker attack attempt, the following could be performed as an aspect of the EFS or operating system with one embodiment being inside of CryptSignHash( ) by changing this API as shown in Table 2:

TABLE 2

Additional Security Program (five components)

1. CryptDuplicateHash( ) - Create a duplicate hash;
2. CryptGetHashParam( ) - Obtain temporary hash parameters;
3. memcmp( ) - Compare the length of the duplicate hash;
4. CryptDestroyHash( ) - Destroy temporary hash;
5. If compare same, then return error - Ensure that the temporary hash is the same as the duplicate hash.

The embodiment of the EFS 48 described herein adds a layer of indirection (the symmetric master key) between the device and the computer memory 54. The symmetric master key allows the EFS to cache the ability to access the computer memory 54. The symmetric master key is derived from the private key of the asymmetric key pair for performance and security reasons. The EFS has not altered the way that files are encrypted or decrypted, and the private key of the asymmetric key pair is still necessary to be associated with the key device at least at some time. The symmetric master key reduces the necessity to continually access the private key of the asymmetric key pair from the key device.

In one embodiment, each application program 410 as shown in FIG. 4 could derive its own symmetric master key. This allows different applications to be associated with different symmetric master keys within the same computer. For example, a particular user can run one application (such as Microsoft Word) having a first symmetric master key which can be configured with its own security profile. Another application program 410 (such as Microsoft Access), which for some reason has a different security profile than the first application, is provided with a second symmetric master key. The security profiles for each of the two application programs can differ. As such, the security profiles as provided by the different symmetric master keys dictate that the different application programs will have different security characteristics.

Figure 5:
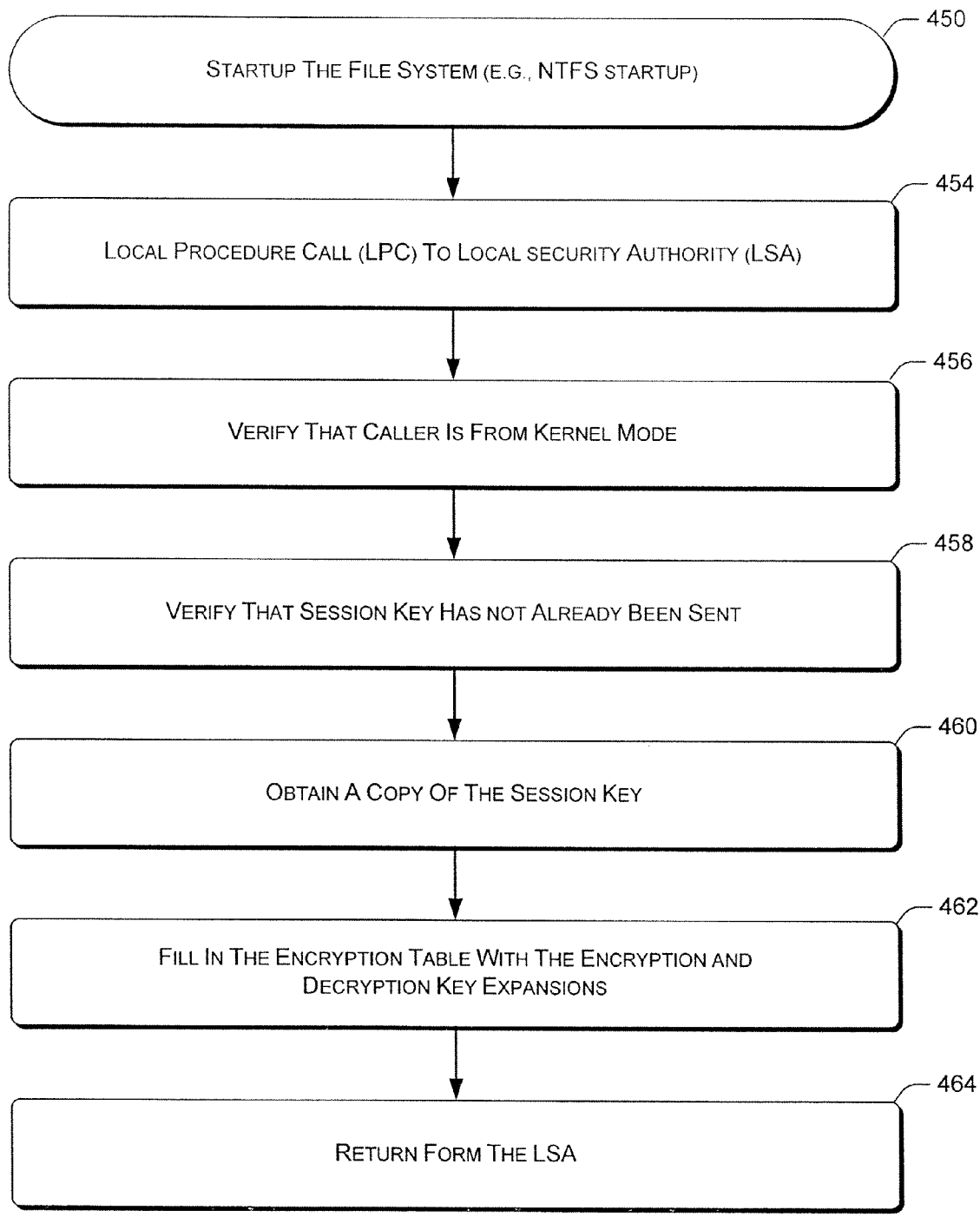
FIG. 5 illustrates the start up for one embodiment of the EFS including a key device.

FIG. 5 illustrates one embodiment of startup process 450 for a file system, such as the Windows NT® File System. The startup process 450 includes a local procedure call 454 provided to the local security authority (LSA) 414 as shown in FIG. 4. The local procedure call may be considered as initiating the authorization process. The startup process 450 continues to 456 in which the EFS verifies that the caller is from the kernel mode. In 458, it is verified that the session key has not been already sent. The startup process 450 continues to 460 in which the EFS obtains a copy of the session key. In 462, an encryption table (such as a DES table) of the session key is filled with the encryption and decryption key expansions. The startup process 450 continues to 464 by returning from the LSA 414.

Figure 6A:
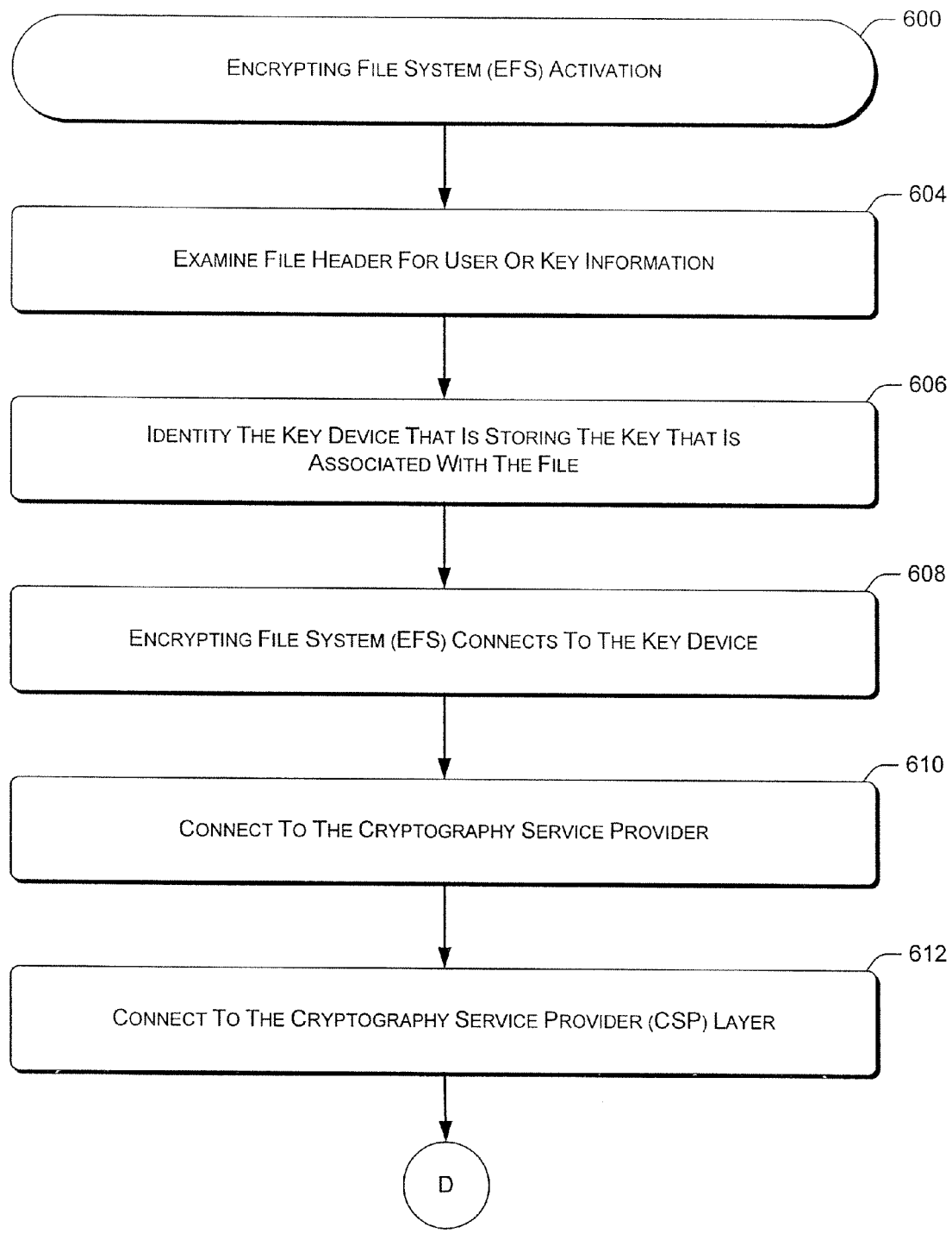
FIGS. 6a and 6b illustrates the activation of one embodiment of the EFS including a key device.
Figure 6B:
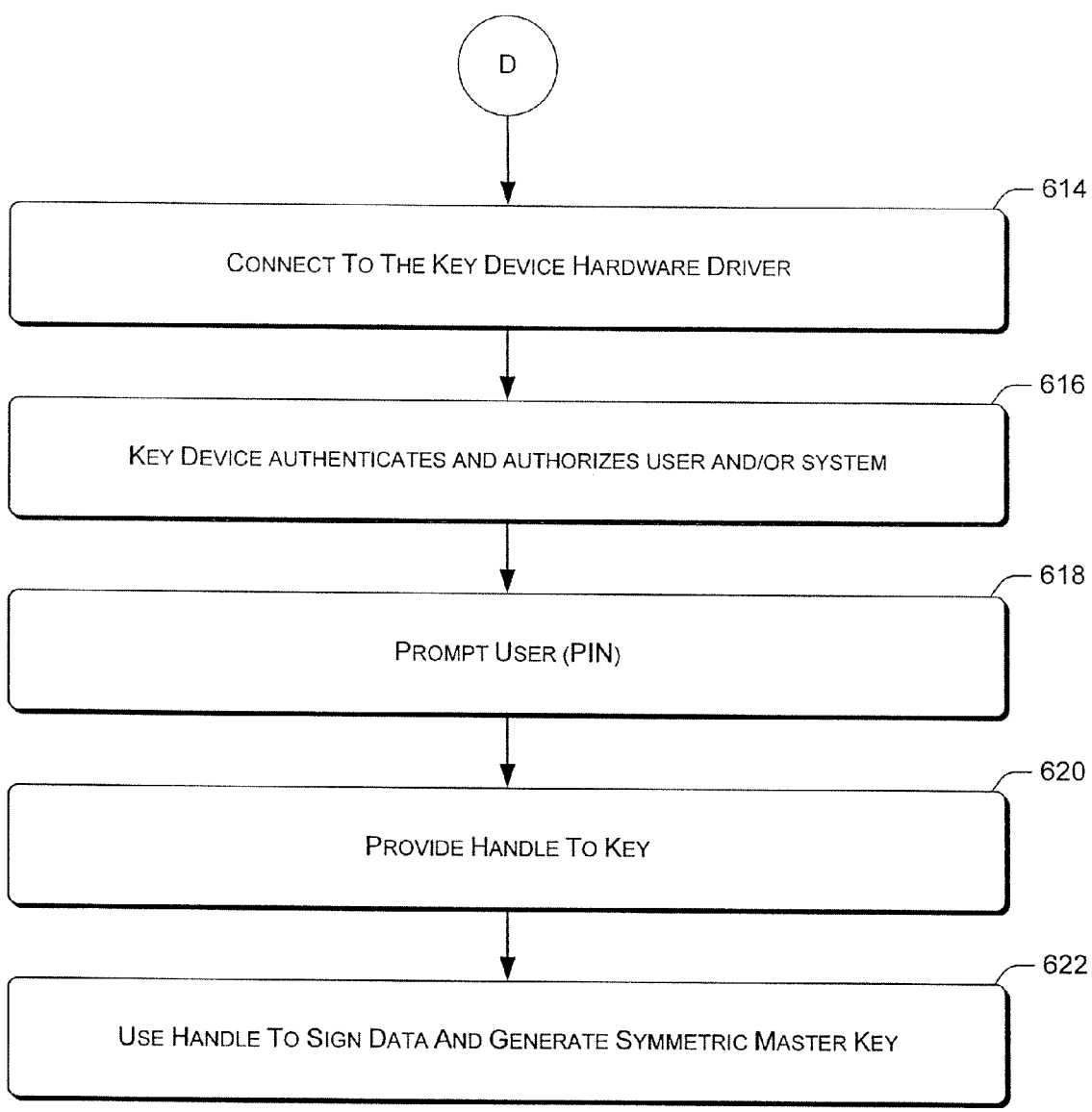

FIGS. 6a and 6b illustrate one embodiment of an EFS activation process 600 by which the EFS produces the symmetric master key. In 604, the file header for the user is examined. The EFS activation method continues to 606 in which the key device that is storing the key that is associated with the file is identified. In 608, the EFS connects to the key device. In 610, the EFS connects to the cryptographic service provider (CSP) 420 as shown in FIG. 4. In 612, the EFS connects to the CSP layer.

The EFS activation process 600 continues to 614 in which the EFS 48 connects to the key device hardware driver 306 as shown in FIG. 3. In 616, the key device is authenticated and authorized based on the key information. In 618, the user is prompted for the user PIN, whereupon the user types in a PIN. The EFS activation process 600 continues to 620 in which the handle to the key is provided from the key device to other portions of the EFS. The EFS activation process 600 continues to 622 in which the handle is used to sign the data and generate the symmetric master key. As such, the EFS activation process illustrates one process by which the symmetric master key is generated based on the activation of one embodiment of the EFS 48.

When a file is to be encrypted or decrypted, the EFS 48 will search where the symmetric master key may be located in as many locations as possible. A brief description of the different locations within the EFS 48 that the symmetric master key can be located is described. This description, however, is intended to be illustrative in nature and not limiting in scope. In effect, any location at which the user can access the symmetric master key is within the intended scope of the present disclosure. The computer memory or device location (that may contain the symmetric master key) is searched in any order or combination.

When a file is to be decrypted, the EFS 48 will search to see if there is a key cache corresponding to the user identifier information, certificates or keys stored on or with the file. One embodiment could be in the file header or another could be an NTFS alternate stream. If there is one, it will be used to decrypt the file. For example, the EFS 48 could search for a current symmetric master key cache that would contain the symmetric master key. If the current symmetric master key cache is found, it will use the symmetric master key stored in the symmetric master key cache to encrypt/decrypt the FEK, and the FEK is thereupon used to encrypt/decrypt the file. If the symmetric master key cache is marked with a symmetric master key model, the symmetric master key encryption will be used.

The EFS 48 can attempt to find what symmetric master key is used for current file operations from the registry. In certain embodiments of the EFS such as those running on Microsoft Windows Operating systems, "path" environment registry strings are patched into the path value in the computer registry key HKEY_CURRENT_USER.\environment in the computer 50 of FIG. 1. The keys from the HKEY_CURRENT_USER ("HKCU") section are used to form the HKEY_USER registry for the NT profile that is associated with the domain account associated with, and used by, the user when logging on to computer 50. In one embodiment of the EFS, the search for the symmetric master key will start from HKCU registry. The user's current key is indicated in the registry. The HKCU registry will indicate if the current key is on the key device 52.

Group policy settings may be created via a group policy editor (a Microsoft Management Console snap-in or similar user interface), and these settings are ordinarily maintained in a computer policy settings location (such as the group policy object (GPO) in certain Microsoft Windows Operating Systems). If the HKCU registry indicates that the current key is not on the key device, the EFS 48 will check to see if the computer policy setting location indicates that the key device 52 is enforced for the user.

If the current HKCU registry key indicates that the $n^{th}$ current key is not on the key device 52 but the computer policy setting location indicates that it must use a key device 52, then the EFS 48 will determine whether the current key pointed to by the registry is on the key device 52. If the current key pointed to by the HKCU registry is not on the key device, the EFS 48 will repair the HKCU registry accordingly. Alternatively, the EFS 48 will delete the HKCU registry. In one embodiment, the user may receive notification of this key repair process or key delete process.

If there is no current key indicated in the registry, the EFS will search any other computer location, such as "MY Store" (In certain Microsoft Windows Operating Systems) to find a current key. If the computer policy settings location indicates that the key device 52 is required, the EFS will only search the key device 52 certificate.

If these above techniques do not yield the symmetric master key, then a user interface device may be provided to let the user set up a key device 52 certificate for the EFS 48 to use. If not, then the private key of the asymmetric key pair may be used to derive the symmetric master key. In summary, the EFS searches all potential computer memory locations for the symmetric master key. If searching these computer memory or device locations yields no symmetric master key, the private key of the asymmetric key pair is used to derive the symmetric master key.

Even though encryption only needs the public key to satisfy security constraints, certain embodiments of the EFS utilize the additional security of the private key of the asymmetric key pair. It is preferred to use the private key of the asymmetric key pair to protect against data loss in the case that the file is encrypted and no decryption key is available. As such, the key device may need to be activated (e.g., the smartcard inserted in the reader) to generate the symmetric master key, which is thereupon used to decrypt the FEK, and thereupon decrypt a file. Whether the symmetric master key model is used in encryption or the cache is to be established depends on the user policy.

Using the symmetric master key (that is stored in the computer memory 54) enables strong private key protection with software cryptographic service providers (CSP), as well as enabling third party CSPs. The EFS 48 uses the symmetric master key model for encryption with both hard keys and soft keys.

It may be desired for users to select certificates to be used when more than one user is accessing the EFS 48. Some users may also have more than one key device 52 for encrypting files. For example, a single user may have a first key device for encrypting relatively high security files or processes and a second key device for encrypting relatively low security files or processes. When a workstation is logged on, but locked, the EFS 48 still may have a key context that may be used for running different applications or processes.

In one embodiment, the EFS 48 is part of the Windows NT security subsystem (NTSS). The EFS 48 can use the existing local procedure call port between a Local Security Authority (LSA) and the kernel mode security monitor to communicate with the EFS driver. In the user mode, the EFS interfaces with Microsoft's Cryptographic API, CryptoAPI, to provide file encryption keys, and generate decryption field information.

To update the file in one embodiment, consider the case where a user has been added to a file by another person (the other person having an RSA public key certificate for that user). A local user opens the file. The EFS 48 detects that the FEK has been encrypted from the symmetric master key (which has in turn been derived from the private key of the RSA asymmetric key pair). A version flag (e.g., 0×1) is stored to detect if the symmetric master key is used or not for a Data Decryption Field (DDF). The EFS 48 then decrypts the FEK. The EFS 48 uses or generates the existing symmetric master key (if the symmetric master key is used in the policy). The EFS 48 updates the FEK encryption using the symmetric master key.

When one user shares an encrypted file with another user, the second user's RSA public key will be used to encrypt the DDF using the RSA public key FEK (i.e., RSA_PUB [FEK]). As soon as the second user opens the file, the corresponding DDF would be changed from the RSA private key of the asymmetric key pair to the symmetric master key (i.e., SYM_KEY[FEK]). There will be a bit in the DDF to indicate which model is used.

Using the symmetric master key model does not pre-empt file sharing. To accomplish file sharing, initially, a first user encrypts a file using a symmetric master key model. The first user then requests (to the general computer system) that the second user be added to the file. The first user adds the second user by getting the public key (certificate), and then encrypting the FEK using the second user's public key. The second user can thereupon access the file. The second user is able to encrypt or decrypt the FEK using their private key of the asymmetric key pair. At the same time, the second user can derive the symmetric master key using their private key of the asymmetric key pair. The file is then thereupon updated using the symmetric master key. In this manner, file sharing can be provided between two users.

The symmetric master key is protected in the computer memory 54 from other processes, rogue applications, paging to disk, pagefile, or hibernation. Also, there is a page-locked key held by lsass.exe for the same purposes. (lsass.exe can lock the computer memory 54, and has its own private implementation of cryptprotectmemory). One embodiment is intended to prevent a standard application like Outlook, IPSEC, SSL/TLS from being spoofed into getting the user signature by using a normal application in a rogue way.

Users can migrate from software-based keys to the key device-based keys relatively easily. The encryption will be performed similarly to current procedures as far as the user is concerned. When a user opens a previously encrypted or decrypted file, the EFS 48 will update the file with the current key. Users will need to migrate from an existing key that is associated with an expired or revoked certificate to a new certificate or key device 52. The EFS 48 will store this symmetric master key in the symmetric master key cache once the user has specified the current private key of the asymmetric key pair (contained within the key device 52). The EFS 48 can store multiple symmetric master keys in the symmetric master key cache.

It is important to note that the use of re-key using symmetric master keys allows multiple key devices to be activated and deactivated for the purposes of populating a key cache. Multiple users of the key devices can then utilize the multiple symmetric master keys to re-key the encrypted or decrypted files. One technique to accomplish this is by having a user type in cipher/rekey to update files using the new key device 52. The EFS 48 sets as CurrentKey and in cache.

The EFS can use the following alternate procedure to migrate to a new key. A user interface (UI) can be provided to accomplish this. A new asymmetric key can be specified as the current private key of the asymmetric key pair just as a user would do without the actuated key device. The rekey command or UI would then call an API to set a rekey state for the caller so that the old smart card key would be updated. The symmetric master key may be held in the computer memory 54 to retrieve the public key from the key device and use the public key to do the re-key. The symmetric master key can be converted and updated later on a file-by-file basis.

The user can also be presented with a UI to change the current EFS certificate. The user can also perform a command line re-key or launch a UI wizard to convert the files to a new symmetric master key. This will be required on files where no automatic re-key is performed. The following logic represents one embodiment that is followed by the EFS 48 for updating symmetric master keys on files:

If no private key of the asymmetric key pair is specified in the registry, then look for an x.509 certificate or asymmetric key pair in the local user profile. If no valid certificate, asymmetric key pair, or private key of the asymmetric key exists in the user profile, then the client may perform enrollment with an external process to derive or import a key to be used.

If the user has a current private key of the asymmetric key pair, an asymmetric key pair, or a certificate specified in the registry, but the file opened has a different symmetric master key, then the certificate property is checked to determine whether the certificate chains to the current symmetric master key. If the certificate corresponds to the current symmetric master key, the file is upgraded to the current symmetric master key. If the certificate does not correspond to the current symmetric master key, the symmetric master key used for the file is not upgraded (i.e., there is no automatic upgrade).

If the user has a current private key of the asymmetric key pair, the asymmetric key pair, or the certificate specified in registry, but the current certificate points to a new symmetric master key (through the property), then the current symmetric master key is updated to use the new certificate and asymmetric key pair.

It is envisioned that certain embodiments of the encrypted file can be re-keyed. One embodiment of this re-keying is now described. Encrypted file re-key will be only supported to the symmetric master key model users. A user interface (UI) should be provided for the re-key. The UI could be used to choose a new card or depend on the UI to set such a card. Before the re-key start, the UI would verify the current certificate is a key device certificate if this UI does not choose the new card. The EFS could then call a function to allow the key device to be updated. Only the person who holds the old card can approve such a rekey and a rekey only happens on the file encrypted or decrypted with that old certificate. When called, the EFS 48 can verify the signed settings associated with the functions. If verified, the EFS 48 will create a key cache for the old certificate if such cache is not available. The UI could call a function after the rekey is done. The UI should enumerate the EFS files in the folder specified by the user. Upon finding the EFS file, an open/close of the file will be done. The UI should let the user specify where to search for the EFS file. The choice should be a folder/file using a pattern or a search of all the local drives. The UI is responsible for the file enumeration.

Every user's symmetric master key is unique. Only individual users can derive their own symmetric master keys. No other individual can derive another person's master key as no one can access another person's private key.

This disclosure describes one embodiment of a digital rights management (DRM) system that incorporates the EFS. Certain embodiments of the EFS 48 that use the FEK to encrypt and/or decrypt files, in which the symmetric master key is used to encrypt the FEK pertain to the DRM system. The EFS can derive the symmetric master keys within the DRM system or, alternatively, in some other configuration that does not include the DRM system.

In a DRM system, the EFS may use a key device or authentication from the private key of the asymmetric key pair to identify the user and determine authorization of the user to obtain access to protected content. The EFS could use a key device or private key of the asymmetric key pair to prove authentication to the DRM system. In this manner, a symmetric key (the FEK) can be obtained from the DRM system that is further used to encrypt and decrypt files on behalf of the user.

Many embodiments of the EFS described herein are intended to operate on a general purpose computer such as the computer 502. A computing environment 500 may include the computer 502 configured in a networked or stand-alone environment, which may comprise any electronic device with computing and/or processing capabilities. The components of computer 502 may include, but are not limited to, one or more processors or processing units 504, a system memory 506 (which may include at least a portion of the computer memory 54 shown in FIG. 1), and a system bus 508 that couples various system components including processor 504 to system memory 506.

System bus 508 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of electronically accessible media. Such media may be any available media that is accessible by computer 502 or another electronic device, and it includes both volatile and non-volatile media, removable and non-removable media, and storage and transmission media.

System memory 506 includes electronically accessible media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules/instructions that are immediately accessible to and/or being presently operated on by processing unit 504.

Computer 502 may also include other removable/non-removable and/or volatile/non-volatile electronic storage media. By way of example, FIG. 7 illustrates a hard disk drive 516 for reading from and writing to a (typically) non-removable, non-volatile magnetic media (not separately shown); a magnetic disk drive 518 for reading from and writing to a (typically) removable, non-volatile magnetic disk 520 (e.g., a "floppy disk"); and an optical disk drive 522 for reading from and/or writing to a (typically) removable, non-volatile optical disk 524 such as a CD-ROM, DVD-ROM, or other optical media. Hard disk drive 516, magnetic disk drive 518, and optical disk drive 522 are each connected to system bus 508 by one or more data media interfaces 526. Alternatively, hard disk drive 516, magnetic disk drive 518, and optical disk drive 522 may be connected to system bus 508 by one or more other separate or combined interfaces (not shown).

The disk drives and their associated electronically accessible media provide non-volatile storage of electronically executable instructions, such as data structures, program modules, and other data for computer 502. Although exemplary computer 502 illustrates a hard disk 516, a removable magnetic disk 520, and a removable optical disk 524, it is to be appreciated that other types of electronically-accessible media may store instructions that are accessible by an electronic device, such as magnetic cassettes or other magnetic storage devices, flash memory cards, CD-ROM, digital versatile disks (DVD) or other optical storage, random access memories (RAM), read only memories (ROM), electrically erasable programmable read-only memories (EEPROM), and so forth. Any electronically-accessible media may be used to realize the storage media of the exemplary computing system and environment 500. Certain embodiments of electronically-accessible media may be construed as, and considered to function as, a computer readable media.

Any number of program modules (or other units or sets of instructions) may be stored on hard disk 516, magnetic disk 520, optical disk 524, ROM 512, and/or RAM 510, including by way of example, an operating system 527, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, a smartcard, a USB token device, a joystick, a game pad, a satellite dish, a serial port, a scanner, and/or the like. These and other input devices are connected to processing unit 504 via input/output interfaces 540 that are coupled to system bus 508. However, they may instead be connected by other interface and bus structures, such as a parallel port, a game port, a universal serial bus (USB) port, an IEEE 1394 interface, an IEEE 802.11 interface, and so forth.

A monitor 542 or other type of display device may also be connected to system bus 508 via an interface, such as a video adapter 544. In addition to monitor 542, other output peripheral devices may include components such as speakers (not shown) and a printer 546, which may be connected to computer 502 via input/output interfaces 540.

Computer 502 may operate in a networked environment using logical connections to one or more remote computers, such as a remote computing device 548. By way of example, remote computing device 548 may be a personal computer, a portable computer (e.g., laptop computer, tablet computer, PDA, mobile station, etc.), a server, a router, a network computer, a peer device, other common network node, or other computer type as listed above, and so forth. Remote computing device 548 is illustrated as a portable computer that may include many or all of the elements and features described herein relative to computer 502.

Logical connections between computer 502 and remote computer 548 are depicted as a local area network (LAN) 550 and a general wide area network (WAN) 552. Such networking environments are commonplace in offices, enterprise-wide computer networks, intranets, the Internet, fixed and mobile telephone networks, other wireless networks, and so forth.

When implemented in a LAN networking environment, computer 502 is connected to a local area network 550 via a network interface or adapter 554. When implemented in a WAN networking environment, computer 502 typically includes a modem 556 or other means for establishing communications over wide area network 552. Modem 556, which may be internal or external to computer 502, may be connected to system bus 508 via input/output interfaces 540 or any other appropriate mechanism(s). It is to be appreciated that the illustrated network connections are exemplary and that other means of establishing communication link(s) between computers 502 and 548 may be employed.

In a networked environment, such as that illustrated with computing environment 500, program modules or other instructions that are depicted relative to computer 502, or portions thereof, may be fully or partially stored in a remote memory storage device. By way of example, remote application programs 558 reside on a memory device of remote computer 548 (which may also include at least a portion of the computer memory 54 shown in FIG. 1). For purposes of illustration, application programs 528 and other executable instructions such as operating system 527 are illustrated herein as discrete processes or programs. It is recognized that such programs, components, and other instructions reside at various times in different storage components of computing device 502 (and/or remote computing device 548) and are executed by data processor(s) 504 of computer 502 (and/or those of remote computing device 548).

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

What is claimed is:

1. A method comprising:
   accessing a private key of an asymmetric key pair in a key device;
   deriving a symmetric master key from the private key of the asymmetric key pair;
   storing the symmetric master key in a computer storage location outside of the key device;
   retrieving the symmetric master key from the computer storage location for encrypting a file encryption key;
   encrypting the file encryption key using the symmetric master key retrieved from the computer storage location, the encryption occurring while the key device is deactivated; and
   encrypting a file using the file encryption key.

2. The method of claim 1, wherein the method is performed within an encrypting file system (EFS).

3. The method of claim 2, wherein the EFS includes a cryptographic service provider (CSP).

4. The method of claim 1, wherein the symmetric master key is associated with a distinct application program.

5. The method of claim 1, wherein the symmetric master key is associated with a first user, further comprising:
   decrypting the encrypted file encryption key using the symmetric master key;
   decrypting the encrypted file using the file encryption key;
   retrieving a public key associated with a second user; and
   encrypting the file encryption key with a public key associated with the second user.

6. The method of claim 5, further comprising accessing the file by the second user.

7. The method of claim 6, wherein the private key is associated with the first user, further comprising, decrypting the encrypted file encryption key, using a private key associated with the second user.

8. The method of claim 7, further comprising:
   deriving an updated symmetric master key using the private key associated with the second user;
   updating the file encryption key with the updated symmetric master key.

9. The method of claim 6, wherein the public key associated with the second user is obtained from an operating system.

10. The method of claim 6, wherein the public key associated with the second user is obtained from the file system.

11. The method of claim 6, wherein the public key associated with the second user is obtained from a digital certificate.

12. A method comprising:
    receiving an encrypted file and an encrypted file encryption key;
    retrieving a symmetric master key from a computer storage location, wherein the symmetric master key was derived from a private key on a key device and the retrieving of the symmetric master key is performed while the key device is deactivated;
    decrypting the encrypted file encryption key using the symmetric master key; and
    decrypting the encrypted file using the file encryption key.

13. A method according to claim 12, further comprising:
    retrieving the private key from the key device;
    deriving the symmetric master key from the private key, wherein the private key is part of an asymmetric key pair; and
    storing the symmetric master key in the computer storage location.

14. The method of claim 12, wherein the method is performed within an encrypting file system (EFS).

15. The method of claim 14, wherein the EFS includes a cryptographic service provider (CSP).

16. The method of claim 12, wherein the symmetric master key is associated with a distinct application program.

17. The method of claim 12, wherein the symmetric master key in a computer memory location includes a first symmetric master key and a second symmetric master key, the first symmetric master key is associated with a first application program to operate under a first security profile, and the second symmetric master key is associated with the second application program to operate under a second security profile.

18. A computer-readable storage medium having computer-executable instructions for performing steps comprising:
    accessing a private key associated with a first user, of an asymmetric key pair associated with the first user, the private key of the first user being in a key device;
    deriving a symmetric master key associated with the first user from the private key associated with the first user;
    storing the symmetric master key associated with the first user in a computer storage location outside of the key device;
    retrieving the symmetric master key associated with the first user from the computer storage location for encrypting a file encryption key;
    encrypting the file encryption key using the symmetric master key associated with the first user, encrypting the file encryption key is performed while the key device is deactivated;

decrypting the encrypted file encryption key to create a decrypted file encryption key;
encrypting a file using the decrypted file encryption key;
decrypting the encrypted file using the decrypted file encryption key;
obtaining a public key associated with a second user; and encrypting the file encryption key with the public key associated with the second user.

19. The computer-readable storage medium of claim 18, further comprising instructions for performing the step of updating file encryption key to be encrypted with a symmetric master key associated with the second user, upon the second user opening the file.

* * * * *